United States Patent
Yoshida et al.

(10) Patent No.: US 8,803,686 B2
(45) Date of Patent: *Aug. 12, 2014

(54) PORTABLE ELECTRONIC DEVICE

(71) Applicant: Icom Incorporated, Osaka (JP)

(72) Inventors: Akihide Yoshida, Osaka (JP); Yoshio Sekiyama, Osaka (JP); Shinji Sugino, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,765

(22) Filed: Jul. 10, 2013

(65) Prior Publication Data

US 2013/0293385 A1    Nov. 7, 2013

Related U.S. Application Data

(63) Continuation of application No. 12/896,215, filed on Oct. 1, 2010, now Pat. No. 8,502,664.

(30) Foreign Application Priority Data

Aug. 19, 2010  (JP) ................................ 2010-183656

(51) Int. Cl.
| | | |
|---|---|---|
| *G08B 13/08* | (2006.01) | |
| *H05B 37/02* | (2006.01) | |
| *H05B 33/08* | (2006.01) | |
| *G08B 21/20* | (2006.01) | |

(52) U.S. Cl.
CPC ............. *G08B 21/20* (2013.01); *H05B 37/0227* (2013.01); *H05B 33/0815* (2013.01)
USPC ........................................ 340/546; 340/545.2

(58) Field of Classification Search
USPC ............... 315/291, 307, 224; 340/546, 545.2, 340/545.3, 545.4, 572.7, 572.8, 572.6, 586, 340/850, 984, 985
See application file for complete search history.

(56) References Cited

U.S. PATENT DOCUMENTS

| | | | |
|---|---|---|---|
| 6,239,444 B1 | 5/2001 | Tanaka et al. | |
| 6,486,777 B2 | 11/2002 | Clark | |
| 6,487,983 B1* | 12/2002 | Jonsson et al. ............ | 114/144 R |
| 7,400,917 B2* | 7/2008 | Wood et al. ................ | 455/575.8 |
| 8,502,664 B2* | 8/2013 | Yoshida et al. ............ | 340/545.2 |
| 2009/0295566 A1* | 12/2009 | Weintraub ............... | 340/539.11 |

FOREIGN PATENT DOCUMENTS

| | | |
|---|---|---|
| JP | 04-135038 U | 12/1992 |
| JP | 3009867 U | 2/1995 |
| JP | 08-261759 A | 10/1996 |
| JP | 2000-344185 A | 12/2000 |
| JP | 2001-106183 A | 4/2001 |
| JP | 2001-313189 A | 11/2001 |
| JP | 2002-111838 A | 4/2002 |

* cited by examiner

*Primary Examiner* — Minh D A
(74) *Attorney, Agent, or Firm* — Muncy, Geissler, Olds & Lowe, P.C.

(57) ABSTRACT

A portable electronic device includes a housing, a drop detection part located on the housing that detects when the device is dropped into water, a light emission part located within the housing, and a light-emission control circuit located within the housing that controls emission of light from the light emission part when the drop detection part detects that the device is dropped into the water. The device is configured to have a buoyancy, and the buoyancy and a center of gravity of the device are configured to let the device float stably in a left-right lateral direction.

18 Claims, 4 Drawing Sheets

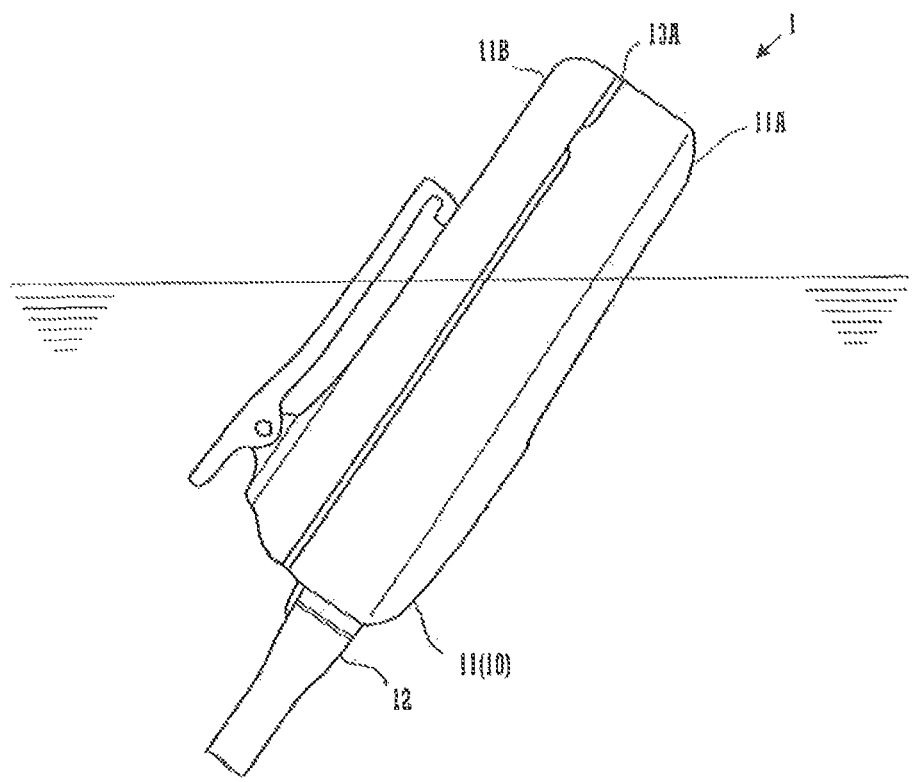
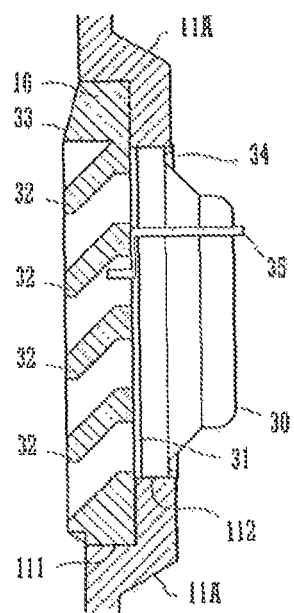
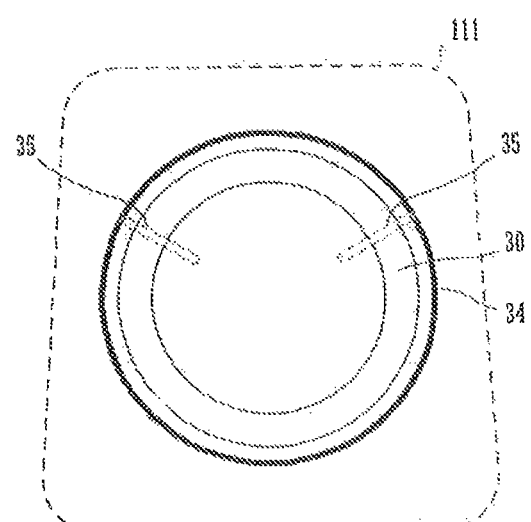

PORTABLE ELECTRONIC DEVICE

CROSS REFERENCE TO RELATED APPLICATION

The present application is a continuation application of U.S. patent application Ser. No. 12/896,215 filed on Oct. 1, 2010, entitled "PORTABLE ELECTRONIC DEVICE," which is related to, claims priority from and incorporates by reference Japanese Patent Application No. 2010-183656, filed on Aug. 19, 2010.

TECHNICAL FIELD

The present invention relates to a portable electronic device and particularly to a portable electronic device that can float on water even if it is dropped into the water.

BACKGROUND

There are many portable electronic devices used close to water such as marine transceivers and the like. Since this type of electronic devices can be accidentally splashed with water or dropped into the water, water-proof devices so that water cannot enter the insides have been put into practice. Also, if the device sinks in the water when being dropped into the water, it cannot be recovered. A floating-type device to stay afloat when being dropped into the water is also proposed, as disclosed by Japanese Laid-Open Patent Application Publication No. H04-135038.

However, at night or when visibility is poor, even if an electronic device floats on the water surface, it is likely that the device cannot be found. In such case, there has been a problem that the electronic device cannot be recovered even though it is floating on the water.

The present invention has an object to provide a portable electronic device that can be easily found on the water surface even at night or if visibility is poor.

SUMMARY

A portable electronic device of the present invention includes a housing, a drop detection part located on the housing that detects when the device is dropped into water, a light emission part located within the housing, and a light-emission control circuit located within the housing that controls emission of light from the light emission part when the drop detection part detects that the device is dropped into the water. The device is configured to have a buoyancy, and the buoyancy and a center of gravity of the device are configured to let the device float stably in a left-right lateral direction.

In a preferred embodiment of the present invention, the light emission part is disposed on the side to be turned up by buoyancy when the device is dropped into the water, and the drop detection part is disposed on the side to be turned down when the device is dropped into the water.

In a preferred embodiment of the present invention, the electronic device has the buoyancy by which at least the light emission part comes up to the water surface when the device is dropped into the water.

In a preferred embodiment of the present invention, an antenna is disposed on a front side of the top face, and a speaker is disposed on the front face, the drop detection part is disposed inside a speaker grill that covers the front of the speaker, and the light emission part is disposed on the bottom face.

In a preferred embodiment of the present invention, the light-emission control circuit includes a delay circuit that keeps the light emission part emitting light for a predetermined time after the drop detection part does not detect drop into the water any longer.

In a preferred embodiment of the present invention, the electronic device has a housing including a front housing, a rear housing and a gasket fitted to a joined part of the front housing and the rear housing, furthermore. And the light emission part includes a translucent section formed at a part of the gasket and a light emitting semiconductor element disposed inside the housing.

According to this invention, since the light emission part emits light when the portable electronic device is dropped into the water, even at night or if visibility is poor, a user can easily find the portable electronic device.

BRIEF DESCRIPTION OF THE DRAWINGS

FIG. 6 is a diagram illustrating an attitude when the transceiver is dropped into the water.

FIG. 7A is a diagram illustrating another embodiment of the vicinity of the speaker grill of the transceiver.

FIG. 7B is a diagram illustrating another embodiment of the vicinity of the speaker grill of the transceiver.

EXPLANATION OF REFERENCE NUMERALS

"1" transceiver
"11" housing
"11A" front housing
"12" antenna
"13" gasket
"13A" translucent section
"16" speaker grill
"21A" projection (of housing)
"30" speaker
"32" fin (of speaker grill)
"35" electrode

DETAILED DESCRIPTION

Figure 1A:
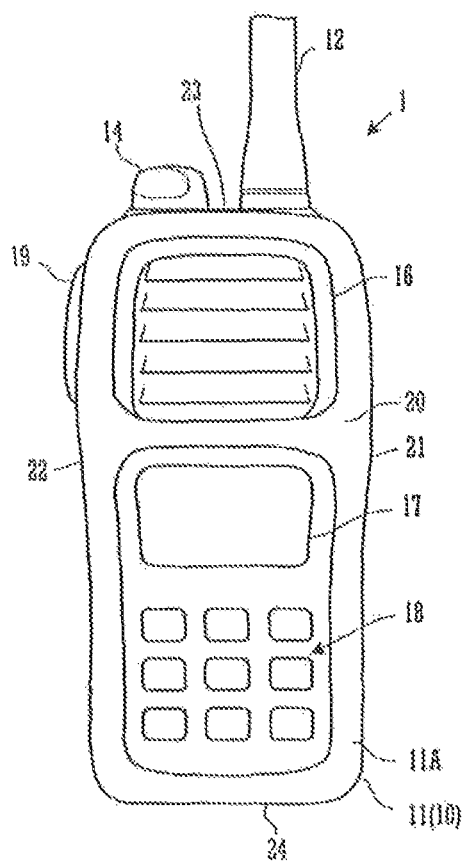
FIG. 1A is a appearance view of a transceiver, which is an embodiment of the present invention.
Figure 1B:
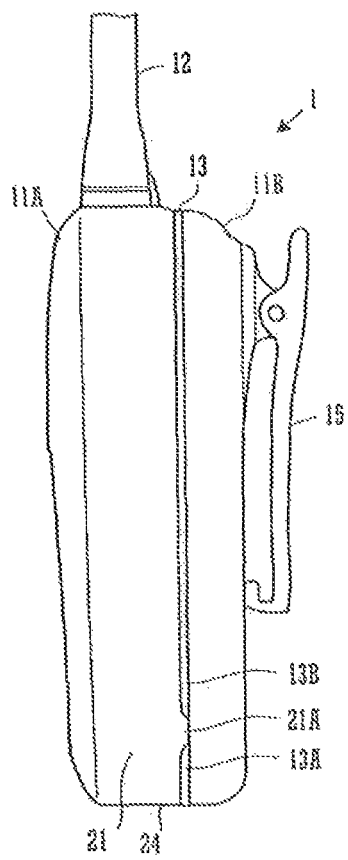
FIG. 1B is a appearance view of the transceiver.
Figure 1C:
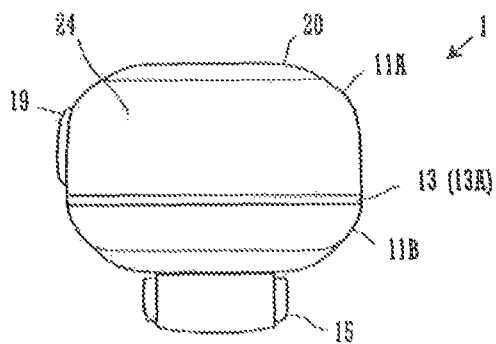
FIG. 1C is a appearance view of the transceiver.

FIG. 1 are appearance views of a transceiver, which is an embodiment of the present invention. FIG. 1A is a front view of the transceiver, FIG. 1B is a left side view of the transceiver, and FIG. 1C is a bottom view of the transceiver.

This transceiver 1 is a hand-held device for maritime communications. A feature of this transceiver 1 is that the transceiver does not sink but floats even if it is dropped into the water and when it is dropped into the water, a part of a housing flashes so that a user can easily find it even at night or if visibility is poor.

The transceiver 1 presents an appearance having a main body 10 including a housing 11 and an antenna 12 disposed on the top face of the housing 11. The housing 11 has a front housing 11A and a rear housing 11B. The front housing 11A and the rear housing 11B are joined with a gasket 13 between them.

The front housing 11A includes a substantially planar front panel 20, and a left face plate 21, a right face plate 22, an top face plate 23 and a bottom face plate 24 rising rearward substantially at a right angle from a peripheral edge of the front panel 20. On edges of the left face plate 21, the right face plate 22, the top face plate 23, and the bottom face plate 24, grooves into which the gasket 13 is inserted are formed. The rear housing 11B has a shape of a lid in which upper, lower, right and left rims gently rise to the front from the rear face on which a clip 15 is disposed. In the edges of the rims, grooves into which the gasket 13 is inserted are formed.

By joining the front housing 11A and the rear housing 11B together with the gasket 13 in their respective groove parts between them, intrusion of water into the inside of the housing 11 through the joined part between the front housing 11A and the rear housing 11B is prevented.

The gasket 13 is in the loop shape and is sandwiched over the entire periphery between the edge of the front housing 11A and the edge of the rear housing 11B. The gasket 13 is exposed to the outside substantially over the entire periphery between the front housing 11A and the rear housing 11B, but the left face plate 21 and the right face plate 22 have projections 21A and 22A on the edges close to their bottoms, and the gasket 13 is hidden from the outside only for the parts of the projections 21A and 22A.

The loop-shaped gasket 13 consists of a translucent section 13A of milk white and a opaque section 13B of blue. The gasket 13 is attached to the housing 11 so that the translucent section 13A is located closer to the bottom face than the projections 21A and 22A and the opaque section 13B is located closer to the top face than the projections 21A and 22A. As a result, a spot where color is roiled at the boundary between the translucent section 13A and the opaque section 13B is hidden behind the projections 21A and 22A, and appearance is maintained while color separation to two colors of the gasket 13 is realized.

On the lower part inside the main body 10 (housing 11), an LED 41 (See FIG. 4) is disposed, and when the transceiver 1 is dropped into the water, the LED 41 flashes. By means of the light, the translucent section 13A of the gasket 13 becomes bright seen from the outside. The LED 41 and the translucent section 13A correspond to the light emission part of the present invention.

The antenna 12 is disposed closer to the front face on the top face of the housing 11, that is, on the top face of the front housing 11A, directed upward. The antenna 12 is a rod-shaped antenna having a coil-shaped antenna wire contained in a resin pipe. The antenna wire is a copper wire or an iron wire, which has a weight. By means of the weight of the antenna 12, the weight balance of the entire transceiver 1 is biased to the upper front.

On the front panel 20 of the front housing 11A, a speaker grill 16, a display 17, and a plurality of keys 18 are disposed in above order. Also, a PTT switch 19 is disposed on the right face plate 22, a charging connector 14 covered by a waterproof cap on the left side of the antenna 12 on the top face plate 23, and a clip 15 at the center of the rear housing 11B, respectively. Inside the speaker grill 16 of the front panel 20, as shown in FIGS. 2 and 3, a speaker 30 and a pair of electrodes 35 that detects drop of the transceiver 1 into the water are disposed.

Figure 2A:
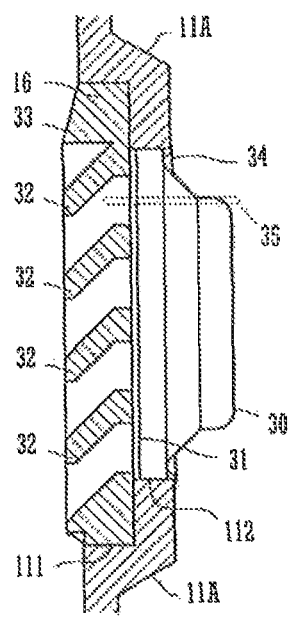
FIG. 2A is a structural diagram of the vicinity of a speaker grill of the transceiver.
Figure 2B:
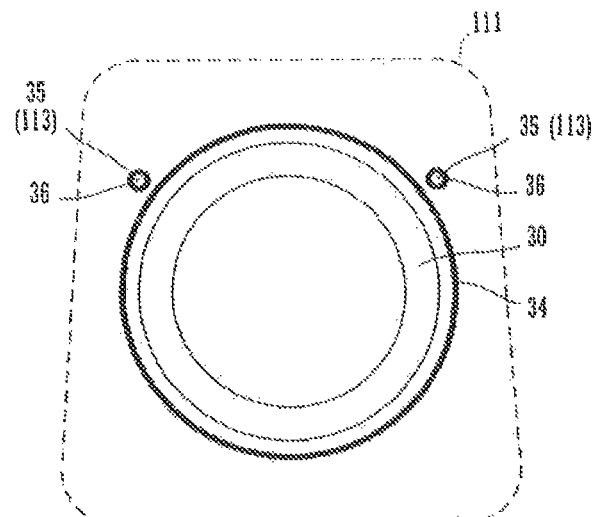
FIG. 2B is a structural diagram of the vicinity of a speaker grill of the transceiver.
Figure 3A:
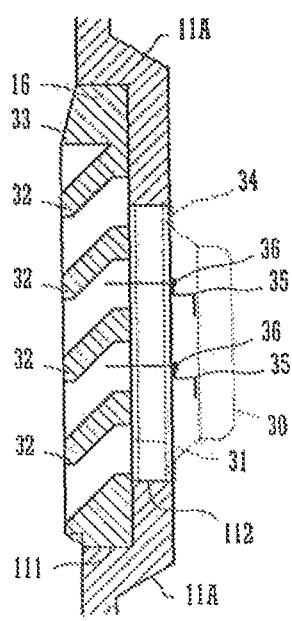
FIG. 3A is a structural diagram of the vicinity of the speaker grill of the transceiver.
Figure 3B:
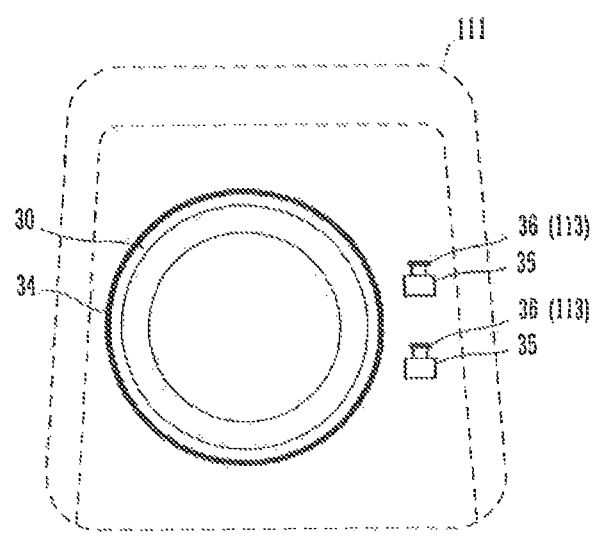
FIG. 3B is a structural diagram of the vicinity of the speaker grill of the transceiver.

A configuration in the vicinity of the speaker grill 16 of the front housing 11A will be described referring to FIGS. 2 and 3. FIGS. 2 and 3 show different embodiments in which mounting forms of the electrodes 35 are different from each other. FIGS. 2A and 3A are left sectional views in the vicinity of the speaker grill 16 of the front housing 11A, while FIGS. 2B and 3B are views of the vicinity of the speaker grill 16 of the front housing 11A seen from behind the speaker 30.

On the upper part of the front panel 20 of the front housing 11A, a grill fitting hole 111, which is approximately square is formed on the outer surface of the front housing 11A with a depth of approximately half of a thickness of the front housing 11A. Also, on the inner surface of the front housing 11A opposing the grill fitting hole 111, a speaker fitting hole 112 is formed circularly into which the speaker 30 is fitted. The speaker fitting hole 112 is formed opposing the center of the grill fitting hole 111 smaller than the grill fitting hole 111. By forming of the grill fitting hole 111 and the speaker fitting hole 112, a circular opening part in the shape of the speaker 30 is formed in the front housing 11A.

The speaker grill 16 is fitted in and fixed to the grill fitting hole 111 from outside the front housing 11A. The speaker grill 16 has an inverted U-shaped frame 33 and a plurality of fins 32 formed in the lateral direction inside the frame 33. In the speaker fitting hole 112, a dust proof net 31 and a waterproof speaker 30 are fitted, and an adhesive 34 is applied on the outer periphery of the speaker 30. By means of this adhesive 34, the speaker 30 and the net 31 are fixed to the front housing 11A, and a gap is blocked. Moreover, the pair of electrodes 35 are disposed, which leads from the inside of the fin 32 to the inside of the front housing 11A are disposed.

In the embodiment in FIG. 2, the shape of the electrode 35 is a straight pin shape. The pair of electrodes 35 are disposed linearly penetrating two through holes 113 formed right and left of the speaker fitting hole 112 of the front housing 11A, respectively. The through hole 113 is formed on the grill fitting hole 111, that is, on the back side of the speaker grill 16 and at a position outside the speaker fitting hole 112. Also, an adhesive 36 is applied on the periphery of the through hole 113 inside the front housing 11A. The adhesive 36 fixes the electrodes 35 and also seals intrusion of water through the through hole 36.

In the embodiment in FIG. 3, the pair of electrodes 35 are aligned vertically on the right side of the speaker 30 seen from the inside of the front housing 11A, and each tip of the electrodes 35 respectively protrudes to the inside of the two fins 32 aligned vertically. Each electrode 35 consists of a conductor strip, and is formed in a stair-like shape having two steps by folding up and down the conductor strip. The tip of the electrode 35 penetrates the through hole 113 and protrudes to the outside of the housing 11, and the first step face is brought into contact with the back side of the front housing 11A so as to prevent removal of the electrode 35 to the outside of the housing 11. Also, the adhesive 36 is applied on the periphery of the through hole 113 inside the front housing 11A. The adhesive 36 fixes the electrode 35 and seals intrusion of the water through the through hole 113. By attaching the electrode 35 in this way, the second step face of the electrode 35 is located in the air floating from the inside of the front housing 11A. As a result, even if the lead wire is soldered on the second step face, the front housing 11A is not melted.

In either of the embodiments in FIGS. 2 and 3, the pair of electrodes 35 are disposed with a distance or in a positional relationship such that both are electrically conducted when they sink under the water and not electrically conducted at such wet of some of droplets. The pair of electrodes 35 corresponds to the drop detection part of the present invention.

Figure 4:
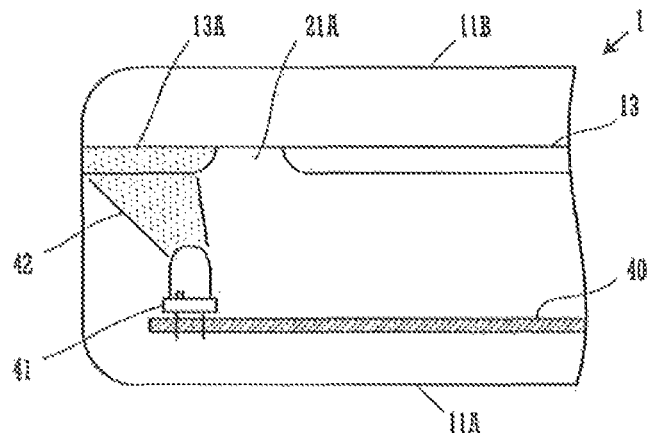
FIG. 4 is an internal structural diagram of a lower part of the transceiver.

FIG. 4 is a diagram for explaining a partial internal structure of the transceiver 1. This diagram is that of the inside of the housing 11 seen from the left side. A print circuit board 40 on which various circuits are mounted is disposed on the front face side inside the housing 11 (in the front housing 11A), and the LED 41 is mounted on the lower end part thereof. The LED 41 is a self-flashing type LED and its turning-on (flashing)/turning-off is controlled by a lighting control circuit shown in FIG. 5. Since the self-flashing LED has a flashing circuit inside, an optical axis 42 is inclined, and as shown in the figure, only by mounting the LED 41 upright to the board, the optical axis 42 can be exactly directed to the direction of the translucent section 13A of the gasket 13. As a result, when the LED 41 is turned on, the translucent section 13A of the gasket 13 is directly illuminated by the light, and it appears from the outside that the translucent section 13A emits light.

Figure 5:
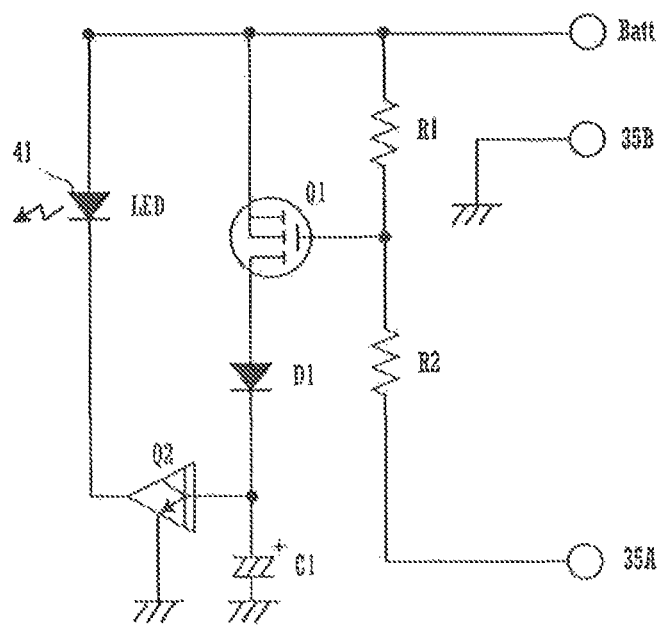
FIG. 5 is a circuit diagram of an LED lighting control circuit of the transceiver.

FIG. 5 is a diagram illustrating a lighting control circuit of the LED 41. This lighting control circuit corresponds to a light-emission control circuit of the present invention. This lighting control circuit is a circuit constituted such that a Pch MOS field-effect transistor (FET) Q1 and an NPN transistor Q2 are turned on when the pair of electrodes 35 (35A and 35B) are electrically conducted each other, and the LED 41 connected between a collector of the transistor Q2 and a power source is made to flash (lighted).

The power source (lithium-ion battery) and this circuit are directly connected to each other without through a power switch, and even if the power switch is off, the LED 41 is made to flash if the transceiver 1 is dropped into the water. A resistor R1, a resistor R2 and the pair of electrodes 35 (35A and 35B) are connected in series between the power source and the ground. A connection point between the resistor R1 and the resistor R2 is connected to the gate of the FET Q1. The source of the FET Q1 is connected to the power source, and a forward-direction diode D1 and a capacitor C1 are connected in series between the drain of the FET Q1 and the ground. A connection point between the diode D1 and the capacitor C1 is connected to the base of the transistor Q2. The transistor Q2 is a transistor for digital operation that incorporates a resistor, and a resistor is connected in series to the base. The LED 41 is connected between the collector of the transistor Q2 and a power source, and the emitter of the transistor Q2 is grounded.

When the transceiver 1 is dropped into the water and the electrodes 35A and 35B are electrically conducted to each other, a power voltage divided at the resistors R1 and R2 is applied to the gate of the FET Q1. As a result, the FET Q1 is turned on, and the capacitor C1 is quickly charged through the diode D1. By the charging of the capacitor C1, a base voltage of the transistor Q2 is raised, and the transistor Q2 is turned on. By the turning-on of the transistor Q2, an electric current flows through the LED 41 and the LED 41 is made to flash.

When the transceiver 1 is taken out of the water and the electrical conduction between the electrodes 35A and 35B is shut off, the FET Q1 is turned off, but since the capacitor C1 has been charged close to the power voltage, the transistor Q2 is kept in the ON state until the capacitor C1 is discharged through the base/emitter of the transistor Q2. The capacitor C1 is chosen based on the capacitance so as to keep Q2 in the ON state for 30 to 60 seconds after shut-off of the electrodes 35A and 35B. As a result, even if a user takes up the transceiver 1 out of the water surface in a dark environment, the LED 41 keeps flashing so as not to miss the transceiver. The transistor Q2 and the capacitor C1 correspond to the delay circuit of the present invention.

Since the transceiver 1 has been saved an entire weight by using a large capacity lithium-ion battery with a light weight as a power source and the like and has the housing 11 of the water-proof structure, the transceiver floats on the water surface without sinking even if it is dropped into the water. Also, as shown in FIGS. 1 to 4, since components with weights such as the speaker 30, the print circuit board 40, the antenna 12 and the like are disposed on the front face side in a biased manner, the center of gravity of the transceiver 1 is close to the front face, and on the water surface, as shown in FIG. 6, the transceiver floats in an attitude with the upper front side down and the lower rear side up. With this attitude, since the electrodes 35 sink in the water, they are electrically conducted by conductivity of water. As a result, the LED 41 flashes. By the flashing of the LED 41, the translucent section 13A on the lower part of the gasket 13 flashes. Since the translucent section 13A is on the water surface and also directed upward, its presence can be displayed such that a user who dropped the transceiver 1 into the water can easily find it.

FIG. 7 are diagrams illustrating another installation form of the electrodes 35. FIG. 7A is a left sectional view of the vicinity of the speaker grill 16 of the front housing 11A, and FIG. 7B is a diagram of the vicinity of the speaker grill 16 of the front housing 11A seen from behind the speaker 30.

In the embodiment in FIG. 7, a through hole exclusively for the electrode 35 is not opened, but the electrode 35 is made to pass through a gap between the speaker fitting hole 112 and the speaker 30. The electrode 35 is formed in a stair-like shape having one step. The electrode 35 reaches the outside from the inside of the front housing 11A (speaker 30 and the net 31) along the outer periphery of the speaker fitting hole 112 and then, bends to the center side of the speaker 30 and reaches the front face of the speaker 30 and bends again and protrudes to the back side of the fin 32.

In above embodiments, a self-flashing LED is used as the LED 41, but a normal LED may be used, and a flashing circuit may be disposed outside of the LED separately.

In above embodiments, a handy transceiver for maritime communications was explained as an example, but the portable electronic device of the present invention is not limited to the handy transceiver.

Also, the transceiver 1 of above embodiments have a structure which is water-proof and floats on the water (has a specific gravity smaller than water), but the present invention can be also applied to a portable electronic device with the specific gravity equal to or larger than water.

What is claimed is:

1. A portable electronic device comprising:
   a housing;
   a drop detection part located on the housing that detects when the device is dropped into water;
   a light emission part located within the housing; and
   a light-emission control circuit located within the housing that controls emission of light from the light emission part when the drop detection part detects that the device is dropped into the water, wherein
   the device is configured to have a buoyancy, and
   the buoyancy and a center of gravity of the device are configured to let the device float stably in a left-right lateral direction.

2. The portable electronic device according to claim 1, wherein
   at least the light emission part comes up to the water surface with the buoyancy when the device is dropped into the water is provided.

3. The portable electronic device according to claim 1, further comprising:
an antenna,
a speaker that includes a speaker grill that covers a front of the speaker, wherein
the drop detection part is disposed inside the speaker grill,
the antenna and the speaker grill are disposed on an upper side of the housing, and
the light emission part is disposed on a bottom side of the housing.

4. The portable electronic device according to claim 1, wherein
the light-emission control circuit is provided with a delay circuit that causes the light emission part to continue emitting light for a predetermined time after the drop detection part no longer detects that the device has been dropped into the water.

5. The portable electronic device according to claim 1, wherein
the housing includes a front housing, a rear housing and a gasket fitted to a joined part of the front housing and the rear housing, and
the light emission part includes a translucent section formed at a part of the gasket and a light emitting semiconductor element disposed inside the housing.

6. The portable electronic device according to claim 1, wherein
the housing is configured in a water proof structure with a predetermined hollow space therein so that the device generates the buoyancy.

7. The portable electronic device according to claim 6, wherein
the light emission part and the light emission control circuit uses a lithium-ion battery as a power source.

8. The portable electronic device according to claim 1, wherein
the drop detection part includes a pair of electrodes that are exposed on a surface of the housing, and
the electrodes are evenly disposed with respect to a center of the housing in the lateral direction.

9. The portable electronic device according to claim 1, wherein
the drop detection part includes a pair of electrodes that are exposed on a surface of the housing, and
the electrodes are disposed to be spaced apart at a distance such that both of the electrodes are electrically connected when the electrodes sink under the water, but are not electrically connected when the electrodes become wet with spaced apart droplets.

10. The portable electronic device according to claim 1, wherein
the light emission part is disposed on a side of the housing that faces upwardly when the device is dropped into the water; and
the drop detection part is disposed on another side of the housing that faces downwardly when the device is dropped into the water.

11. The portable electronic device according to claim 1, further comprising:
a speaker, wherein
the speaker is disposed on the same side of the housing as the light emission part is.

12. A portable electronic device comprising:
a buoyant housing;
a drop detection part located on the housing that detects when the device is dropped into water;
a light emission part located on the housing and in communication with the drop detection part, the light emission part being configured to emit light when the drop detection part detects that the device is dropped into the water; and
a light-emission control circuit located within the housing and connected to the light emission part to control emission of light from the light emission part when the drop detection part detects that the device is dropped into the water, wherein
the device is configured to float stably in a left-right lateral direction when the device is in the water.

13. The portable electronic device according to claim 12, wherein
the light-emission control circuit is configured to continue controlling the emission of light from the light emission part when the device is in the water.

14. The portable electronic device according to claim 12, wherein
assuming that the housing is divided into two sides, one side being an under-water side which remains under the water and the other side being an above-water side which remains above the water when the device is in the water,
the drop detection part is disposed on the under-water side.

15. The portable electronic device according to claim 12, wherein
the drop detection part includes a pair of electrodes that are exposed on a surface of the housing, and
the electrodes are evenly disposed with respect to a center of the housing in the lateral direction.

16. The portable electronic device according to claim 12, wherein
the drop detection part includes a pair of electrodes that are exposed on a surface of the housing, and
the electrodes are disposed to be spaced apart at a distance such that both of the electrodes are electrically connected when the electrodes sink under the water, but not electrically connected when the electrodes become wet with some of droplets.

17. The portable electronic device according to claim 12, wherein
the light emission part is disposed on a side of the housing that faces upwardly when the device is dropped into the water; and
the drop detection part is disposed on another side of the housing that faces downwardly when the device is dropped into the water.

18. The portable electronic device according to claim 12, further comprising:
a speaker, wherein
the speaker is disposed on the same side of the housing as the light emission part is.

* * * * *